Jan. 31, 1933.                S. E. BAKER                1,895,833
                              PASTRY MIXER
                           Filed Jan. 8, 1931
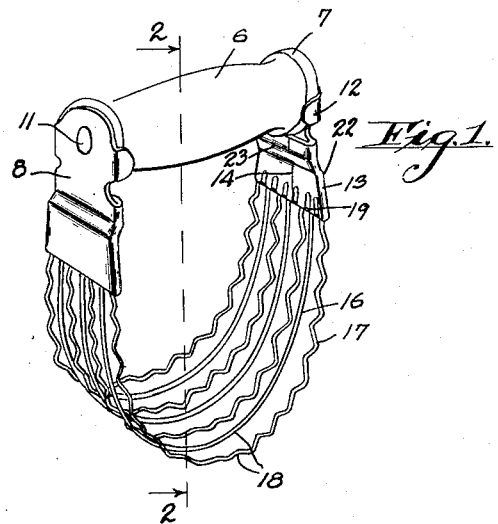
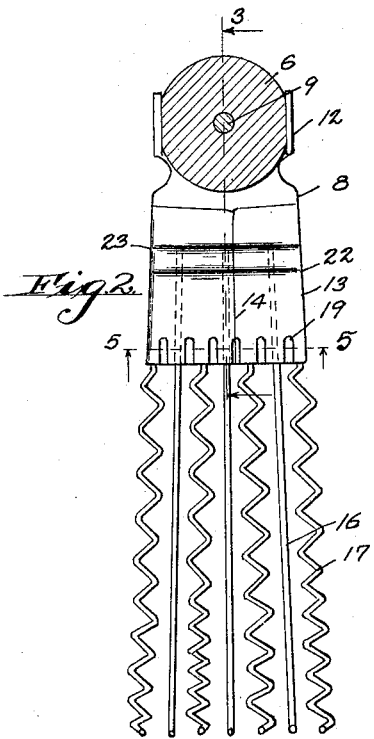
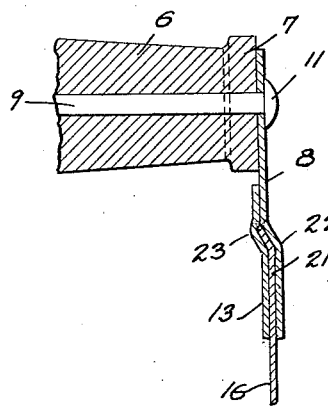
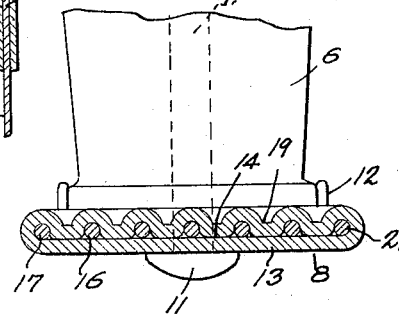
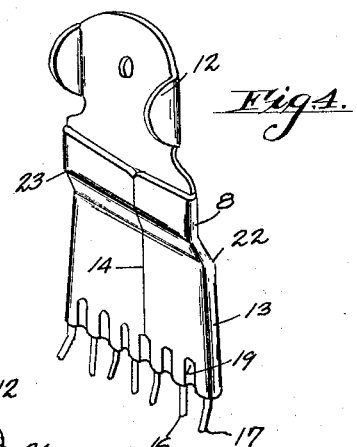
Inventor
Stewart E. Baker,
By Hazard and Miller
Attorneys Patented Jan. 31, 1933

1,895,833

UNITED STATES PATENT OFFICE

STEWART E. BAKER, OF SOUTH PASADENA, CALIFORNIA

PASTRY MIXER

Application filed January 8, 1931. Serial No. 507,410.

This invention relates to kitchen utensils, and more especially to an improved design of mixer or beater of the type commonly employed for mixing or blending pastry dough, beating eggs, whipping cream, crushing or comminuting relatively soft cooked vegetables, and analogous uses.

An object of the invention is to provide a beater in the form of a handle having a plurality of U-shaped wires secured at their ends to the handle, with the central portions of the wires bowed outwards therefrom, thereby presenting mixing, cutting or beating blades curved substantially into conformity with the interior surface of a bowl wherein is contained the material to be operated upon by the device of the present invention.

A further object is to provide a beater of the general character described, in which the blades are in the form of resilient but relatively stiff wires, certain of which are sinuous so as to enhance the efficiency of operation of the beater.

A further object is to provide means for retaining the blades and the handle in alinement with each other.

A still further object is to provide abutment means for absorbing the thrust exerted by the ends of the blades against the handle, thereby adding materially to the inherent strength of the entire device.

An additional object is to provide a utensil of the general character described, which is capable of being manufactured easily and relatively cheaply, and yet which is capable of operating with a high degree of efficiency in carrying out the functions for which it has been designed.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a perspective view of a mixer embodying the principles of the present invention.

Fig. 2 is an enlarged vertical transverse sectional view taken upon the line 2—2 of Fig. 1, with the direction of view as indicated.

Fig. 3 is a longitudinal vertical sectional view taken through one end of the handle portion of the beater to show the method whereby the blades are secured thereto.

Fig. 4 is a perspective view of one of the plates whereby the blades are secured to the handle.

Fig. 5 is a more highly enlarged horizontal sectional view taken through one of the attaching plates upon the line 5—5 of Fig. 2, with the direction of view as indicated.

Specifically describing that embodiment of my invention which at present appears to be the most practical, I have provided my improved mixer or beater with a handle 6 which preferably is of wood, although other materials equally satisfactory for this use are available. Preferably, the handle 6 is shaped in such a manner that it can be grasped comfortably by the hand of the operator, and has enlarged portions 7 at the ends thereof, as clearly shown upon Figs. 2 and 3. An attaching plate 8 is secured to and extends laterally from each end of the handle 6, any suitable means being employed for securing the plates to the ends of the handle 6, such, for example, as an elongated rivet 9 extending longitudinally through the handle 6 and being upset at its ends, as indicated at 11, permanently and rigidly to attach both plates 8 thereto. It should be understood, however, that separate attaching means may be employed for the individual plates 8, such as a nail or screw or the like extending through each plate and into the associated end of the handle.

Each of the plates 8 is provided at its inner end with a pair of ears 12 which extend longitudinally with respect to the handle 6, embracing the associated end thereof so as to enhance the rigidity of the connection between the plate and the handle, and to hold the associated plate 8 accurately in a plane perpendicular to the longitudinal axis of the handle.

A socket portion 13 is formed at the outer end of each plate 8 by reversely bending at least one side edge, but preferably both side edges, so that they extend back upon the body of the lower end of the plate 8, bringing the extreme edges 14 of these portions of the plate into abutment with each other, as best illustrated upon Fig. 4.

A plurality of cutting, beating or mixing blades 16 and 17 are secured at their ends in the socket portions 13 of the opposed plates 8. Preferably, these blades 16, 17 are formed of resilient wire, such as spring steel wire, and each alternate blade 16 is straight before having its ends secured to the plates 8, whereas the remaining wires 17 are sinuous, as clearly shown upon Figs. 1 and 2. All of the wires 16, 17 are of substantially the same length, thus positioning the outermost curved or tread portions 18 of all the wires 16, 17 substantially in a common curved plane. Moreover, the sinuosity of the alternate wires 17 extends in this same plane.

Each end of each of the wires 16, 17 extends into the socket portion 13 of one of the plates 8, and is securely fastened therein by having the metal of which the plate 8 is constructed crimped inwards, as indicated at 19, to collapse the outermost portion of the associated socket 13 between each adjacent pair of wires, thus rigidy retaining the wires in spaced relation to each other, and also effectually closing the entrances to the socket between the wires, whereby a more sanitary condition is obtained because lodging of dough and other material within the sockets is prevented by their being thus closed.

Moreover, each end 21 of each wire 16, 17 extends for a material distance into the associated socket portion 13 which is bent along a transverse line 22, which line is intersected by the associated ends 21 of all the wires, as indicated upon Fig. 3. This construction provides abutment means whereby the thrust exerted by each of the wires against the plates 8 may be absorbed without danger of displacement of the wires with respect to the plates. However, in order to keep both ends of each plate 8 in planes substantially parallel, a second bend 23 is formed therein, thus offsetting the inner and outer ends of the plate from each other.

I prefer that instead of being disposed truly parallel to each other the wires 16, 17 be arranged in fan-like design, whereby they are at slightly greater distances apart at their tread portions 18 than adjacent the attaching plates 8. Obviously, however, this construction is optional and is employed only to increase the quantity of material which may be engaged by the beater each time the beater is forced thereinto.

It is to be understood that the details of the invention as herein disclosed, are subject to alteration within the spirit or scope of the appended claims.

I claim:
1. In a mixing device of the character described, a handle, a plurality of mixing or cutting blades comprising pieces of wire bent to U-shaped design, and means for fastening said wires to said handle comprising a plate rigid with and extending laterally from each end of said handle, a socket portion formed in each of said plates, an end of each of said wires extending into the socket of each of said plates, and means securing said wires within said sockets, each of said plates being bent along a transverse line intersected by the associated ends of said wires to provide an abutment therefor and means providing an abutment for the ends of the wires.

2. A pastry mixer comprising a handle and a plurality of corrugated wire blades connected to the ends of the handle, said blades being bent into approximately semicircular shape and arranged in substantially transverse alignment, the planes of the corrugations in the blades being also transversely arranged.

3. A pastry mixer comprising a handle, a plurality of wire blades connected to the ends of the handle, alternate blades being corrugated and intermediate blades being straight except that all blades are bent into semicircular shape, the blades being arranged in substantially transverse alignment and the corrugations in the corrugated blades having planes extending transversely.

4. A pastry mixer comprising a handle, flat fittings at the ends of the handle, each fitting having inner and outer walls, and semicircular blades having their ends extending into the fittings between the walls, one of the walls of each fitting being corrugated with the ends of the blades disposed in the corrugations, the fittings and ends of the blades therein having a transversely extending bend so that the ends of the blades are bent laterally the bent portions of the fittings thus locking the blades in place in the fittings.

In testimony whereof I have signed my name to this specification.

STEWART E. BAKER.